Patented Apr. 27, 1937

2,078,555

UNITED STATES PATENT OFFICE 2,078,555

PRODUCTION OF AMINES BY EMULSION METHOD

Cesare Barbieri, New York, N. Y.

No Drawing. Application April 30, 1934, Serial No. 723,209

15 Claims. (Cl. 260—127)

The present invention relates to a process of producing amines.

Heretofore various processes have been utilized for the production of amines. In general, prior processes were relatively inefficient, gave poor yields and produced a relatively impure product containing side reaction compounds, isomers, polymers and the like. A particular objection against prior processes was that only small scale manufacture could be carried out and that mass production on a large industrial basis could not be carried into practice in a wholly practical and satisfactory manner. Many proposals have been made to overcome the disadvantages and avoid the shortcomings of prior processes. Of the various proposals, those attempting to produce amines on a large scale industrial basis deserve special consideration. Curme, for instance, in U. S. Patent No. 1,832,534 describes a complex process of making ethylene diamine.

Other attempts have been made to provide a process for the production of amines which could be carried out on an industrial scale to produce commercial products with commercial yields. Among these attempts may be mentioned those involving the use of high temperatures and/or high pressures. The processes involving relatively high temperatures had a tendency to cause the production of side reaction, polymerization and decomposition products and involved difficulties in controlling the thermal conditions. The other processes operating under high pressures required the use of a heavy, bulky and strong apparatus which was expensive to build and expensive to operate. As far as I am aware, the art has not been provided with a wholly satisfactory process which can be conducted on a commercial scale for the production of acceptable commercial products with high yields in relatively simple apparatus operating under relatively low pressures and/or temperatures.

It is an object of the present invention to overcome the shortcomings of old processes and to provide a process of producing amines which is safe, practical and commercial.

It is a further object of the invention to provide a process which can be conducted on an industrial scale with commercially acceptable products and with high yields in relatively simple apparatus operating under relatively low pressures and/or temperatures.

It is also within the contemplation of the invention to provide a process of producing amines in which the reaction is carried out in the liquid state.

Furthermore, the present invention provides a process of producing amines which can be controlled, and which has no tendency to build up excessive temperatures and pressures, and which can be effected by means of emulsions.

Other objects and advantages will become apparent from the following description of the invention.

Broadly stated, the present invention contemplates a process in which the reactants contact each other thoroughly in the liquid state and the reaction is conducted practically entirely in the liquid state. In this process, the reactants are intimately mixed in the form of an emulsion which is preferably formed in a separate apparatus. The emulsion is then introduced into a reaction vessel where the reaction is accomplished under relatively low pressure and/or temperature conditions. By removing the liquid mass from the reaction vessel the solid product can be recovered.

For the purpose of giving those skilled in the art a better understanding of the invention the following specific examples are given for illustrative purposes:

Example No. 1

Production of ethyl amine $$C_2H_5NH_2$$

In carrying the invention into practice ethyl bromide and aqua ammonia may be used as the raw materials. As the aqua ammonia and ethyl bromide are immiscible liquids, the present invention contemplates the employment of some emulsification agent. I have found that the following proportions and reagents may be used to give satisfactory results: about 3000 parts by volume 19% ammonia, about 200 parts by volume of ethyl bromide, about 65 parts by volume of ethyl alcohol, and about 15 parts by volume of a 10% soap solution. These reagents may be emulsified in any appropriate manner. In practice, I have found that satisfactory results can be produced with a colloid mill.

rious raw materials or reagents which may be used in the present process is given.

Schedule

| Reagent | Boiling point | Normal state | Amines produced | Boiling point |
|---|---|---|---|---|
| | C. | | | C. |
| Ethylene dichloride | 84° | Liquid | Ethylene diamine | 118° |
| Ethylene dibromide | 131° | do | do | 118° |
| Ethylene bromchloride | 107° | do | do | 118° |
| Propylene dichloride | 97° | do | Propylene diamine | 120° |
| Propylene dibromide | 142° | do | do | 120° |
| Propylene bromchloride | 114° | do | do | 120° |
| Ethyl bromide | 39° | do | Ethyl amine | 19° |
| Ethyl chloride | 12° | do | do | 19° |
| Isopropyl bromide | 60° | do | Isopropyl amine | 32° |
| Isopropyl chloride | 36° | do | do | 32° |
| Propyl bromide | 71° | do | Propyl amine | 49° |
| Propyl chloride | 46° | do | do | 49° |
| Butyl bromide | 101° | do | Butyl amine | 78° |
| Butyl chloride | 78° | do | do | 78° |
| Amyl bromide | 128° @ 740 mm. | do | Amyl amine | 104° |
| Amyl chloride | 107° @ 740 mm. | do | do | 104° |

I claim:

1. In the process of producing amines that improvement which comprises forming an emulsion of a halide of a lower aliphatic hydrocarbon in liquid state and ammonia, and then heating said emulsion to cause the formation of an amine hydrohalide.

2. In the process of producing amines that improvement which comprises forming an emulsion containing aqua ammonia, a lower alkyl halide in liquid state and an emulsifying agent and subjecting said emulsion to, relatively low heat of about 100° C. to cause the formation of an amine hydrohalide.

3. In the process of producing amines that improvement which comprises emulsifying aqua ammonia, a lower alkyl halide in liquid state, soap and an organic solvent, and subjecting the emulsion to relatively low heat of about 100° C. at a low pressure of about 100 pounds per square inch to cause the formation of an amine hydrohalide.

4. In the process of producing amines that improvement which comprises emulsifying aqua ammonia, a lower alkyl halide in liquid state, and an emulsifying agent, and subjecting the emulsion in a closed reaction vessel to relatively low heat of about 100° C. in order to give a low pressure of about 100 pounds per square inch within the vessel to cause the formation of an amine hydrohalide.

5. In the process of producing amines that improvement which comprises forming an emulsion containing a lower alkyl halide in the liquid state and an emulsifying agent, introducing said emulsion into a closed reaction vessel containing aqua ammonia and subjecting the reaction vessel to relatively low heat of about 100° C. to effect the generation of a low pressure of about 100 pounds per square inch whereby a lower alkyl amine hydrohalide is formed.

6. In the process of producing amines that improvement which comprises forming an emulsion containing a lower alkyl halide in liquid state and an emulsifying agent, introducing said emulsion into a closed reaction vessel containing aqua ammonia and subjecting the contents of the reaction vessel to heat to effect the generation of a low pressure of about 100 pounds per square inch whereby an amine hydrohalide is formed.

7. In the process of producing amines that improvement which comprises emulsifying a liquid lower alkyl halide, an alcohol and an aqueous soap solution, introducing the emulsified mass in portions into aqua ammonia contained in a closed reaction vessel, and heating said reaction vessel to produce a temperature to give a low pressure of about 100 pounds per square inch whereby an amine hydrohalide is formed.

8. The process of producing amines which comprises reacting a lower alkyl halide in liquid state with ammonia in an emulsion to form an amine hydrohalide, causticizing said amine hydrohalide to produce an amine and an alkali metal halide, and reacting said alkali halide with alcohol in the presence of an acid to form a lower alkyl halide for use in the first operation hereof.

9. The process of producing amines which comprises reacting a lower alkyl halide in liquid state with ammonia in an emulsion under relatively low heat of the order of about 100° C. and pressure of the order of about 100 pounds per square inch to form an amine hydrohalide, causticizing said amine hydrohalide to produce an amine and an alkali metal halide and reacting said alkali halide with alcohol in the presence of an acid to form a lower alkyl halide for use in the first operation hereof.

10. In the process of producing amines that improvement which comprises forming an emulsion containing about 3000 parts of 19% aqua ammonia, about 200 parts by volume of ethyl bromide, about 65 parts by volume of ethyl alcohol and about 15 parts by volume of a 10% soap solution, introducing said emulsion into about 1000 parts by volume of 19% aqua ammonia contained in a closed reaction vessel, and subjecting said reaction vessel to heat to give a temperature giving a low pressure of about 100 lbs. per square inch.

11. In the process of producing amines that improvement which comprises forming an emulsion containing about 3000 parts by volume of 19% aqua ammonia, about 200 parts by volume of ethyl bromide, about 65 parts by volume of ethyl alcohol and about 15 parts by volume of a 10% soap solution, successively introducing portions of said emulsion into about 1000 parts by volume of 19% aqua ammonia contained in a closed reaction vessel until about 3000 parts by volume of said emulsion have been so introduced, and subjecting said reaction vessel to heat to give a temperature giving a low pressure of about 100 lbs. per square inch.

12. In the process of producing amines that improvement which comprises forming an emulsion containing about 3000 parts by volume of 19% aqua ammonia, about 200 parts by volume of ethylene dichloride, about 65 parts by volume of ethyl alcohol and about 15 parts by volume of a 10% soap solution, introducing said emulsion into about 1000 parts by volume of 19% aqua ammonia contained in a closed reaction vessel, and subjecting said reaction vessel to heat to give a temperature giving a low pressure of about 100 lbs. per square inch.

13. In the process of producing amines that improvement which comprises forming an emulsion containing about 3000 parts by volume of 19% aqua ammonia, about 200 parts by volume of isopropyl bromide, about 65 parts by volume of ethyl alcohol and about 15 parts by volume of a 10% soap solution, introducing said emulsion into about 1000 parts by volume of 19% aqua ammonia contained in a closed reaction vessel, and subjecting said reaction vessel to heat to give a temperature giving a low pressure of about 100 lbs. per square inch.

14. In the process of producing an amine that improvement which comprises forming an emulsion containing ammonia and an ethyl halide, and subjecting said emulsion to a relatively low heat at a temperature of about 100° C. in a closed vessel to form a hydrohalide of ethyl amine.

15. In the process of producing an amine that improvement which comprises forming an emulsion containing aqua ammonia and ethyl bromide and subjecting said emulsion to relatively low heat at a temperature of about 100° C. in a closed vessel to cause the formation of ethyl amine hydrohalide.

CESARE BARBIERI.